United States Patent
Ohno

(10) Patent No.: US 7,522,166 B2
(45) Date of Patent: Apr. 21, 2009

(54) VIDEO GAME PROCESSING METHOD, VIDEO GAME PROCESSING APPARATUS AND COMPUTER READABLE RECORDING MEDIUM STORING VIDEO GAME PROGRAM

(75) Inventor: Koji Ohno, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 784 days.

(21) Appl. No.: 10/306,158

(22) Filed: Nov. 29, 2002

(65) Prior Publication Data

US 2003/0098864 A1 May 29, 2003

(30) Foreign Application Priority Data

Nov. 29, 2001 (JP) ............................. 2001-364858

(51) Int. Cl.
*G06T 15/40* (2006.01)
*G06T 15/00* (2006.01)

(52) U.S. Cl. ........................................ 345/422; 345/419
(58) Field of Classification Search .................. 345/422
See application file for complete search history.

(56) References Cited

U.S. PATENT DOCUMENTS

| | | | | |
|---|---|---|---|---|
| 5,249,264 A | * | 9/1993 | Matsumoto .................. | 345/624 |
| 5,359,704 A | * | 10/1994 | Rossignac et al. ........... | 345/422 |
| 5,522,018 A | * | 5/1996 | Takeda et al. ............... | 345/422 |
| 5,574,835 A | * | 11/1996 | Duluk et al. ................ | 345/421 |
| 5,596,686 A | * | 1/1997 | Duluk, Jr. ................... | 345/422 |
| 5,751,291 A | * | 5/1998 | Olsen et al. ................. | 345/422 |
| 5,825,363 A | * | 10/1998 | Anderson .................... | 345/422 |
| 5,949,423 A | * | 9/1999 | Olsen ......................... | 345/422 |

(Continued)

FOREIGN PATENT DOCUMENTS

EP 1063615 12/2000

(Continued)

OTHER PUBLICATIONS

Iones, A., "On optimality of OBBs for visibility tests for frustum culling, ray shooting and collision detection", Proceedings Computer Graphics International, Jun. 22-26, 1998, pp. 256-263.*

(Continued)

*Primary Examiner*—Ulka Chauhan
*Assistant Examiner*—Roberta Prendergast
(74) *Attorney, Agent, or Firm*—Greenblum & Bernstein, P.L.C.

(57) ABSTRACT

A simple model for an object to be processed is obtained, and Z-values and display coordinates of vertexes of the simple model from a predetermined viewpoint are calculated. A rectangular Z-area associated with the calculated display coordinates is detected, and an area of a predetermined size is generated based upon the detected Z-area while keeping a feature of the detected Z-area. A minimum value Z1MIN of the simple model is extracted. The minimum value Z1MIN of the simple model is compared with all of the Z-values within the generated area, which are stored in a Z-buffer at that time. If it is determined that the minimum value Z1MIN of the simple model is larger than the maximum value Z2MAX within the generated area, subsequent steps are skipped. Thus, processing of a real model can be avoided, which reduces the processing.

19 Claims, 5 Drawing Sheets

U.S. PATENT DOCUMENTS

| | | | |
|---|---|---|---|
| 6,037,946 A | 3/2000 | Takeda | |
| 6,094,200 A | 7/2000 | Olsen et al. | |
| 6,246,415 B1 | 6/2001 | Grossman et al. | |
| 6,409,598 B1 | 6/2002 | Takeuchi | |
| 6,443,842 B1 | 9/2002 | Totsuka | |
| 6,456,285 B2 * | 9/2002 | Hayhurst | 345/422 |
| 6,525,726 B1 * | 2/2003 | Xie et al. | 345/421 |
| RE38,078 E * | 4/2003 | Duluk, Jr. | 345/422 |
| 6,603,474 B1 * | 8/2003 | Cobb et al. | 345/421 |
| 6,628,281 B1 * | 9/2003 | Fossum et al. | 345/422 |
| 6,628,284 B1 * | 9/2003 | Fossum et al. | 345/427 |
| 6,646,639 B1 * | 11/2003 | Greene et al. | 345/422 |
| 6,650,325 B1 * | 11/2003 | Voorhies et al. | 345/426 |
| 6,661,914 B2 * | 12/2003 | Dufour | 382/154 |
| 6,680,734 B2 * | 1/2004 | Kobayashi | 345/422 |
| 6,734,854 B1 * | 5/2004 | Shimizu | 345/422 |
| 6,738,059 B1 * | 5/2004 | Yoshinaga et al. | 345/419 |
| 2002/0082081 A1 | 6/2002 | Takeuchi | |

FOREIGN PATENT DOCUMENTS

| | | |
|---|---|---|
| JP | 8161526 | 6/1996 |
| JP | 8-249495 | 9/1996 |
| JP | 2000-182077 | 6/2000 |
| JP | 2000182077 | 6/2000 |
| JP | 2000-268191 | 9/2000 |
| JP | 2001-148035 | 5/2001 |
| JP | 2001148035 | 5/2001 |

OTHER PUBLICATIONS

Sanna, A.; Montuschi, P., "On the computation of groups of bounding boxes for fast test of objects intersection", Proceedings of 1995 IEEE 14th International Phoenix Conference on Computers and Communications, Mar. 28-31, 1995, pp. 684-690.*

English Language Abstract for JP Appln. No. 2001-148035,2001.

Zhang, H., "Effective Occlusion Culling for the Interactive Display of Arbitrary Models," Dissertation Submitted to the Faculty of the University of North Carolina, pp. 49-58; 1998.

Moller, T. et al., "Real-Time Rendering," A. K. Peters, Natick, pp. 194-219, 1999.

Moller, T. et al., "Occlusion Culling Algorithms," Real-Time Rendering 1999, Retrieved from http://www.gamasutra.com/features/19991109/moller_haines_01.htm on Feb. 25, 2004.

English Language abstract of JP 2000-182077, 2000.

English Language abstract of JP 2000-268191, 2000.

English Language abstract of JP 8-249495, 1996.

English Language abstract of JP 2001-148035,2001.

* cited by examiner

VIDEO GAME PROCESSING METHOD, VIDEO GAME PROCESSING APPARATUS AND COMPUTER READABLE RECORDING MEDIUM STORING VIDEO GAME PROGRAM

CROSS REFERENCE TO RELATED APPLICATION

The present disclosure relates to subject matter contained in Japanese Patent Application No. 2001-364858, filed on Nov. 29, 2001, the disclosure of which is expressly incorporated herein by reference in its entirety.

BACKGROUND OF THE INVENTION

1. Field of the Invention

The present invention relates to video game processing. More particularly, the present invention relates to displaying a virtual space from a virtual viewpoint on a screen.

2. Description of the Related Art

A role playing game (called "RPG" hereinafter) is known as one video game genre. In a RPG, a character plays a role in a game instead of a player. In general, the player experiences a pseudo adventure through a character manipulated by the player (called "player character" hereinafter) so as to develop a story. In many cases, a player character and characters fighting against the player character (called "enemy character" hereinafter) are set in zones formed in a virtual space. The player character advances to each zone, where the player character fights against the enemy characters that prevent the player character from achieving his/her goal in the story. In addition, the player character obtains items that provide advantages during the fights and defeats the enemy character so as to develop the story.

In order to display an image from a certain viewpoint in a video game machine for implementing an RPG by displaying objects such as a player character and an enemy character in a virtual space on a screen, an object to be hidden behind a predetermined object is not displayed. For example, Z-buffer processing is used for removing hidden-parts. As a technology relating to the Z-buffering, an image synthesizing apparatus and an image synthesizing method are disclosed in Japanese Unexamined Patent Publication No. 8-161526, for example.

However, multiple characters may be required to be displayed on a single screen in a conventional RPG. As a result, a processing amount involved in the Z-buffering is increased. Thus, there is a problem that the number of displayed characters may be limited due to the processing capacity of the game machine. Similarly, when a character is required to be displayed in more detail, the number of polygons forming the character tends to increase. As a result, a processing amount involved in the Z-buffering increases as the number of polygons increases. Then, there is a problem that a number of polygons that can be used for other characters may be limited.

SUMMARY OF THE INVENTION

The present invention is made in view of these problems. It is an object of the present invention to provide a video game processing method, a video game processing apparatus and a computer readable recording medium storing a video game program, which allow a more detailed character or more characters to be displayed in a video game by achieving fast rendering processing.

In order to overcome the problems and to achieve these objects, according to first aspect of the present invention, there is provided a video game processing method for displaying a virtual space viewed from a virtual viewpoint on a screen. The method includes obtaining a simple model, which bounds a polygon group of an object in the virtual space. The method further includes calculating first depth information from the viewpoint and display coordinates with respect to a vertex of the simple model. The method further includes obtaining present depth information from the viewpoint with respect to an area corresponding to the display coordinates. The method further includes comparing the first depth information with the present depth information. The method further includes stopping further processing of the object when the first depth information indicates a depth that is deeper than a depth indicated by the present depth information.

According to the first aspect, the processing can be simplified by using a simple model so that rendering processing can be performed fast. Thus, a more detailed character or more characters can be displayed.

In the first aspect, obtaining the present depth information may include obtaining one piece of typical depth information for each of multiple display coordinates in the area. Also, comparing may include comparing the first depth information with the typical depth information. Thus, the depth information to be processed can be summarized, and the rendering processing can be performed faster.

Preferably, in the first aspect, the typical depth information is a maximum value for each of the display coordinates in the area. Thus, only the meaningful depth information is summarized, and the rendering processing can be performed confidently.

In the first aspect, the simple model may be a hexahedron having eight vertexes. The area in accordance with the display coordinates may be a rectangle. Data of the vertex of the object may be provided with identification information. In, this case, obtaining the simple model is performed in accordance with the identification information. Thus, the rendering processing can be performed confidently and fast.

According to a second aspect of the present invention, there is provided a video game processing apparatus for displaying a virtual space viewed from a virtual viewpoint on a screen. The apparatus includes a first obtaining system that obtains a simple model, which bounds a polygon group of an object in the virtual space. The apparatus further includes a calculator that calculates first depth information from the viewpoint and display coordinates with respect to a vertex of the simple model. The apparatus further includes a second obtaining system that obtains present depth information from the viewpoint with respect to an area corresponding to the display coordinates. The apparatus further includes a comparator that compares the first depth information with the present depth information. Furthermore, the apparatus includes a stopping system that stops further processing of the object when the first depth information indicates a depth that is deeper than a depth indicated by the present depth information.

According to the second aspect, the processing can be simplified by using a simple model so that rendering processing can be performed fast. Thus, a more detailed character or more characters can be displayed.

In the second aspect, the second obtaining system may obtain one piece of typical depth information for each of multiple display coordinates in the area. The comparator may compare the first depth information with the typical depth information. Thus, the depth information to be processed can be summarized, and the rendering processing can be performed faster.

According to the second aspect, the second obtaining system may be implemented by an image processing unit having an image reduction function. The typical depth information for each of the display coordinates in the area may be obtained by the image processing unit. By using an existing unit such as the image processing unit, an increase in hardware size and/or an increase in costs can be suppressed, and, at the same time, the rendering processing can be performed faster.

Preferably, in the second aspect, the typical information is a maximum value for each of the display coordinates in the area. Thus, only the depth information, which is meaningful, is summarized, and the rendering processing can be performed confidently.

In the second aspect, the simple model may be a hexahedron having eight vertexes. The area corresponding to the display coordinates may be a rectangle. Data of the vertex of the object may be provided with identification information. The data of the vertex of the object is preferably provided with identification information, and the first obtaining system may further include a supply system that supplies the data of the vertex of the object to the first obtaining system in accordance with the identification information. Thus, the rendering processing can be performed confidently and fast.

According to a third aspect of the present invention, there is provided a computer readable recording medium on which is recorded a video game program for displaying a virtual space viewed from a virtual viewpoint on a screen. The program causes a computer to obtain a simple model, which bounds a polygon group of an object in the virtual space. The program further causes the computer to calculate first depth information from the viewpoint and display coordinates with respect to a vertex of the simple model. The program further causes the computer to obtain present depth information from the viewpoint with respect to an area corresponding to the display coordinates. The program further causes the computer to compare the first depth information with the present depth information. The program further causes the computer to stop further processing of the object when the first depth information indicates a depth that is deeper than a depth indicated by the present depth information.

According to the third aspect, the processing can be simplified by using the simple model, and rendering processing can be performed fast. Thus, a more detailed character or more characters can be displayed.

In the third aspect, obtaining the present depth information may include obtaining one piece of typical depth information for each of multiple display coordinates in the area. Also, comparing may include comparing the first depth information with the typical depth information. Thus, the depth information to be processed can be summarized, and the rendering processing can be performed faster.

Preferably, in the third aspect, the typical depth information is a maximum value for each of the multiple display coordinates in the area. Thus, only the meaningful depth information is summarized, and the rendering processing can be performed confidently.

In the third aspect, the simple model may be a hexahedron having eight vertexes. The area corresponding to the display coordinates may be a rectangle. Data of the vertex of the object may be provided with identification information, so that obtaining the simple model is performed in accordance with the identification information. Thus, the rendering processing can be performed confidently and fast.

DESCRIPTION OF THE PREFERRED EMBODIMENTS

Figure 1:
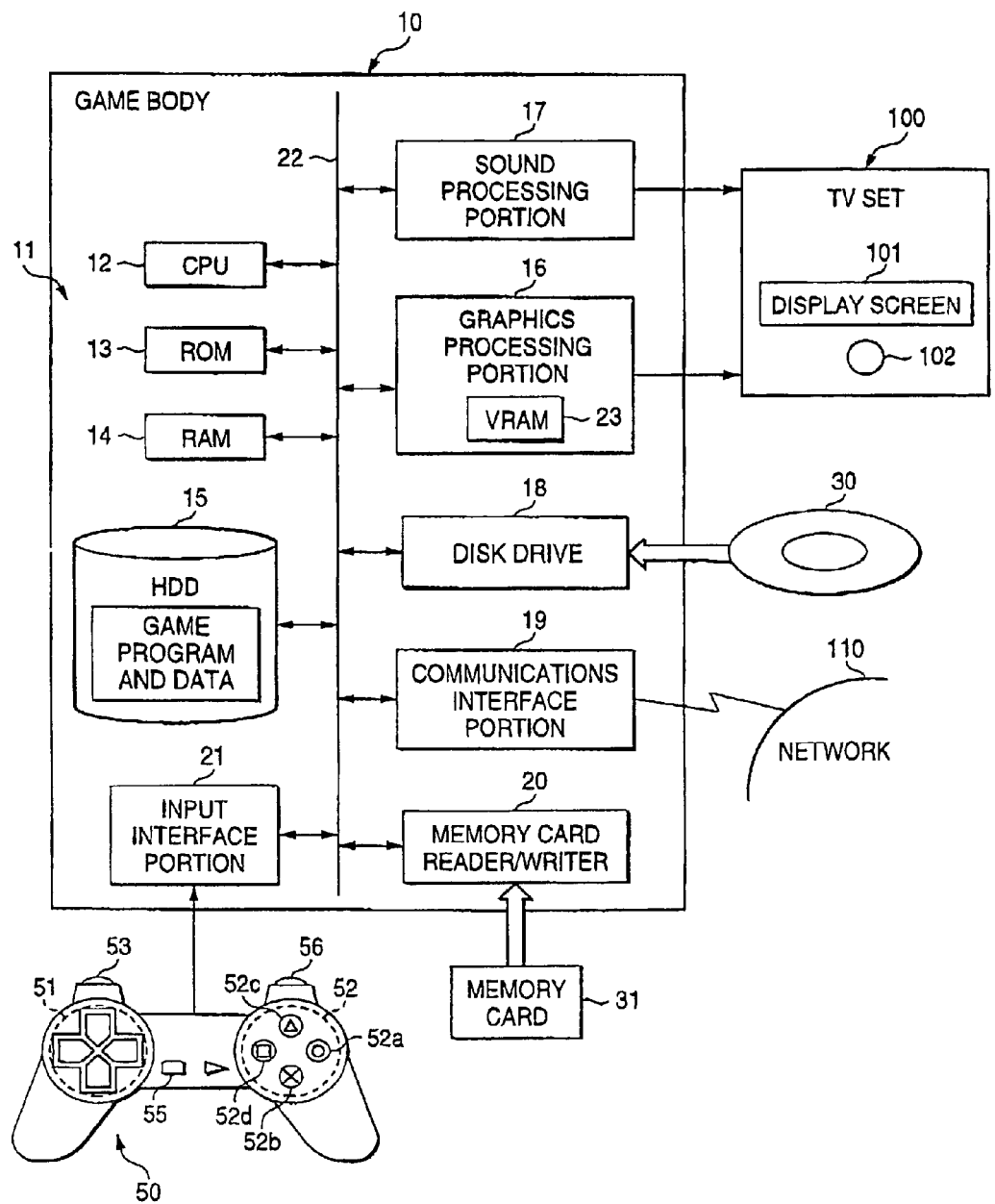
FIG. 1 is a block diagram showing a video game machine according to an embodiment of the present invention.

An embodiment of the present invention will be described below with reference to the attached drawings. FIG. 1 is a block diagram showing an example of a configuration of a video game machine, according to an embodiment of the present invention.

First of all, a video game machine according to an embodiment of the present invention will be described. A game machine 10 includes a game machine body 11 and a keypad 50 connected to an input side of the game machine body 11. A television set 100 having a cathode ray tube (CRT) and a speaker is connected to an output side of the game machine body 11.

The game machine body 11 includes a central processing unit (CPU) 12, a read only memory (ROM) 13, a random access memory (RAM) 14, a hard disk drive (HDD) 15, and a graphics processing portion 16. The game machine body 11 also includes a sound processing portion 17, a disk drive 18, and a communications interface portion 19. A memory card reader/writer 20 and an input interface portion 21 are also provided. All components are connected via a bus 22. The game machine body 11 is connected to the keypad 50 serving as an operation input portion, through the input interface portion 21.

A cross key 51 and a button group 52 are provided on the keypad 50. The button group 52 includes a circle button 52a, an X-button 52b, a triangle button 52c and a square button 52d. A select button 55 is provided at a joint part between a base having the cross key 51 and a base having the button group 52. Multiple buttons such as an R1 button 56 and an L1 button 53 are provided on the side of the keypad 50.

The keypad 50 includes switches linking with the cross key 51, the circle button 52a, the X-button 52b, the triangle button 52c, the square button 52d, the select button 55, the R1 button 56 and the L1 button 53, respectively. When each of the buttons is pressed, the corresponding switch is turned on. Then, a detection signal in accordance with ON/OFF of the switch is generated in the keypad 50.

The detection signal generated in the keypad 50 is supplied to the input interface portion 21. The detection signal from the keypad 50 passed through the input interface 21 can serves as detection information indicating which button on the keypad 50 is turned on. Thus, an operation instruction given from a user to the keypad 50 is further supplied to the game machine body 11.

The CPU 12 performs overall control of the entire apparatus by executing an operating system stored in the ROM 13. The CPU 12 executes a video game program stored in a program area of the RAM 14. In addition, the CPU 12 monitors a manipulation state on the keypad 50 through the input interface 21 and executes a video game program stored in the program area of the RAM 14 as necessary. Furthermore, various kinds of data derived from the progress of a game are stored in predetermined areas, respectively, of the RAM 14 as necessary.

The RAM 14 includes a program area, an image data area, a sound data area and an area for storing other data. Program data, image data, sound data and other data, which are read from a disk 30 such as a DVD and a CD-ROM through the disk drive 18, are stored in respective areas.

The RAM 14 is also used as a work area. Various kinds of data derived from the progress of a game are stored in an area for storing other data. Program data, image data, sound data, and other data read from the disk 30 can be stored in the hard disk drive 15. The program data, image data, sound data and other data stored in the hard disk drive 15 may be transferred to the RAM 14 as necessary. Various kinds of data derived from the progress of a game, which are stored in the RAM 14, may be transferred and stored in the hard disk drive 15.

The graphics processing portion 16 includes a frame buffer as a buffer memory for storing image data and a Z-buffer for storing depth information in the VRAM 23. The graphics processing portion 16 determines whether the object can be displayed, by executing a processing as described later, while referring to the z value that serves as the depth information at the time when the value is written into the z buffer in accordance with control information sent from the CPU 12 upon the execution of program. Then, the graphics processing portion 16 stores the object that can be displayed in the frame buffer by Z-buffering. Then, the graphics processing portion 16 generates video signals based on image data stored in the frame buffer in accordance with predetermined timing, and outputs the video signal to a television set 100. Thus, an image is displayed on a screen display portion 101 of the television set 100.

Specifically, image data including color information to be displayed in respective display coordinates is stored in the frame buffer. A Z-value, serving as the depth information corresponding to image data stored in the display coordinates of the frame buffer, is stored in the Z-buffer. Based on these kinds of information, the image data stored in the frame buffer is displayed on the screen displaying portion 101 of the television set 100. The graphics processing portion 16 includes an image processing unit having a sprite function for deforming, enlarging and reducing an image. Thus, an image can be processed variously in accordance with control information from the CPU 12.

The sound processing portion 17 has a function for generating a sound signal such as background music (BGM), a conversation between characters and sound effects. The sound processing portion 17 outputs the sound signals to a speaker 102 of the television set 100 based on data stored in the RAM 14 in accordance with control information from the CPU 12 upon program execution.

The television set 100 has the screen display portion 101 and the speaker 102 and displays images and outputs sound in accordance with a content of a video game based on video signals and/or sound signals from the game machine body 11.

The disk (such as a DVD and a CD-ROM) 30, which is a recording medium, can be removably loaded in the disk drive 18. The disk drive 18 reads program data, image data, sound data and other data of a video game stored in the disk 30.

The communications interface portion 19 is connected to a network 110. The communications interface portion 19 obtains various kinds of data by exchanging data with a data storage device and/or information processing device such as a server located in another place. The program data, image data, sound data and other data of the video game stored in the RAM 14 may be obtained via the network 110 and the communications interface portion 19.

A memory card 31 can be removably loaded in the memory card reader/writer 20. The memory card reader/writer 20 writes a smaller amount of saved data such as progress data of the video game and environment setting data of the video game in the memory card 31.

A video game program for displaying a virtual space from a virtual viewpoint on a screen is recorded in a recording medium according to one embodiment of the present invention, that is, the disk 30. The disk 30 is readable by a computer (the CPU 12 and peripheral devices). By reading and executing the program, the computer can obtain a simple model that bounds a polygon group of an object in a virtual space. The computer can also calculate first depth information from a viewpoint and display coordinates with respect to a vertex of the simple model. Furthermore, the computer can obtain present depth information from a viewpoint with respect to an area corresponding to the display coordinates and compare the first depth information with the present depth information. Furthermore, the computer can stop the execution of subsequent steps for the object when the first depth information indicates a depth that is deeper than a depth indicated by the present depth information.

Accordingly, in addition to functions required for performing software processing based on data stored in memories of the CPU 12 and other parts and executing a conventional video game by using hardware in the game machine body 11, the game machine body 11 includes, as unique functions relating to image processing, a first obtaining unit for obtaining a simple model, which bounds a polygon group of an object in a virtual space. The game machine body 11 further includes a calculating unit for calculating first depth information from a viewpoint and display coordinates with respect to a vertex of the simple model. The game machine body 11 further includes a second obtaining unit for obtaining present depth information from a viewpoint with respect to an area corresponding to the display coordinates. The game machine body 11 includes a comparing unit for comparing the first depth information with the present depth information. The game machine body 11 further includes a stopping unit for stopping the execution of subsequent steps for the object when the first depth information indicates a depth that is deeper than the present depth information.

In this case, the second obtaining unit of the game machine body 11 includes a function for obtaining one piece of typical depth information for each of the multiple display coordinates in the area corresponding to the display coordinates. The comparing unit includes a function for comparing the first depth information with the typical depth information.

Therefore, image processing can be performed fast, and a video game can be achieved in which a more detailed character or more characters can be displayed. In this case, these unique functions may be implemented by specific hardware.

Figure 2:
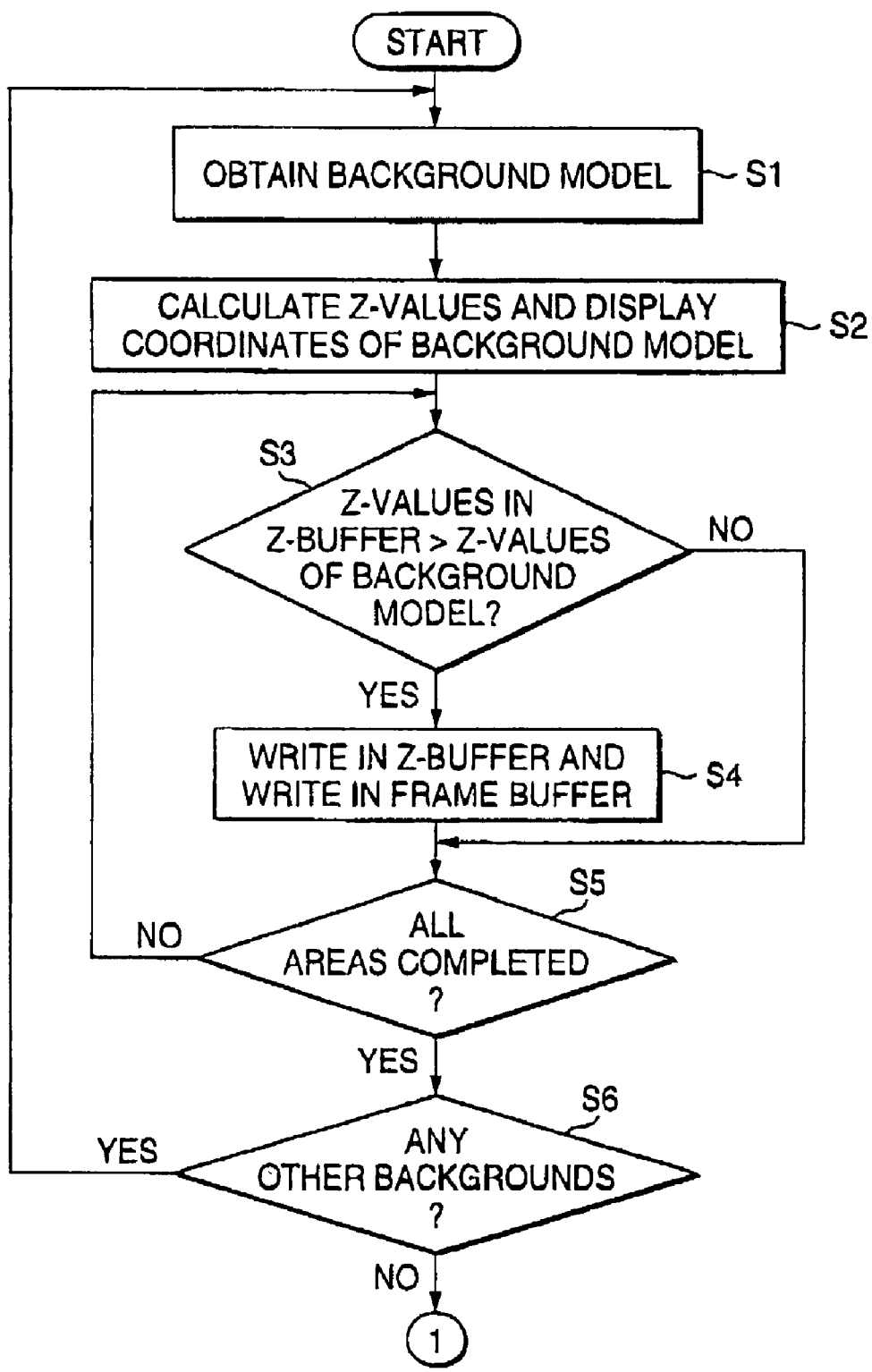
FIG. 2 is a flowchart for explaining operations relating to rendering processing according to an embodiment of the present invention.
Figure 3:
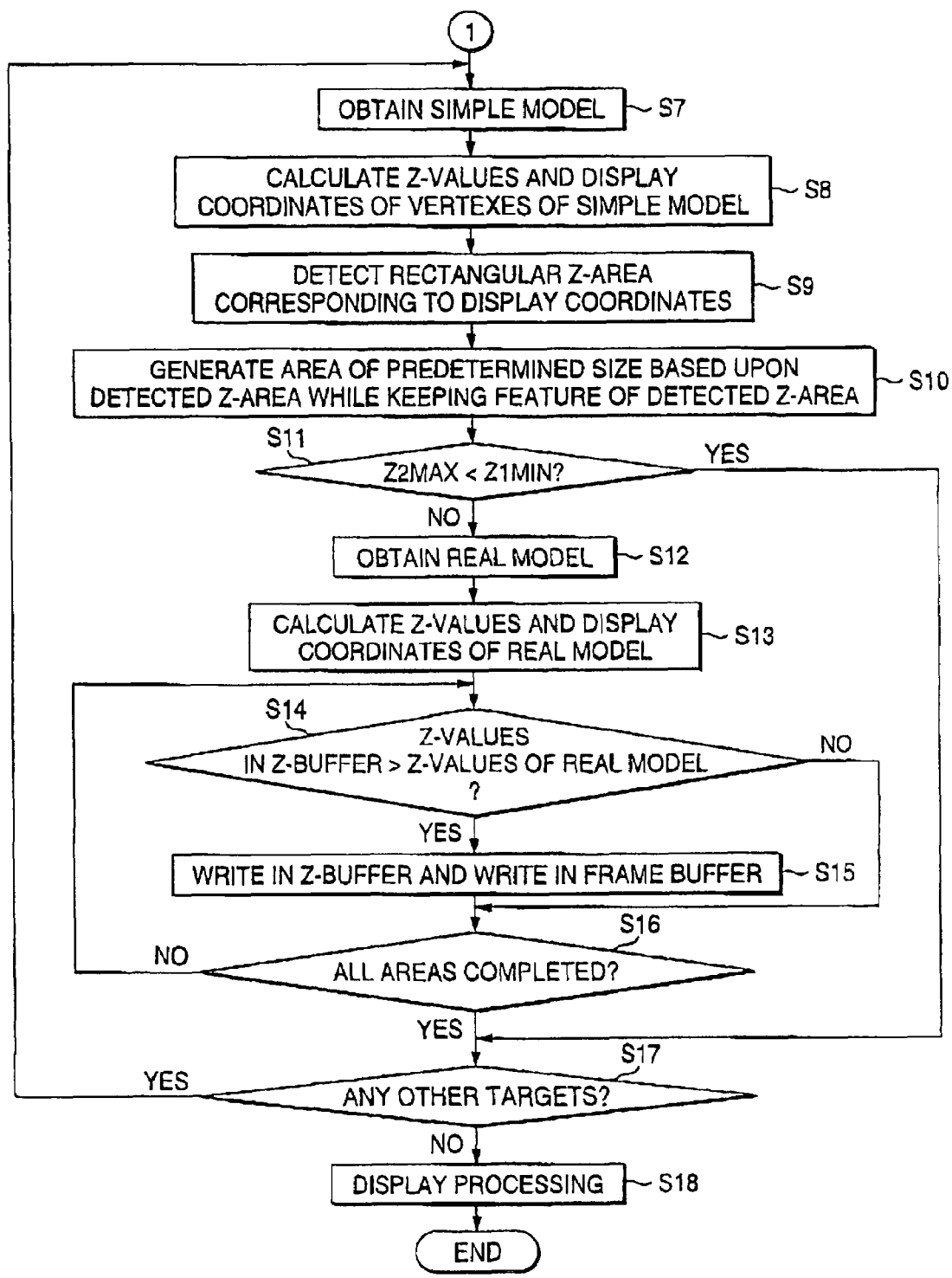
FIG. 3 is a flowchart for explaining operations relating to rendering processing according to an embodiment of the present invention.

Next, operations of this embodiment having the construction as described above will be described. FIGS. 2 and 3 are illustrative schematic flowcharts showing processing steps involved in the image processing according to the embodiment.

First of all, though not shown in FIG. 2, when a system is powered on, a boot program is read out and each of the components is initialized, and processing for starting a game is performed. In other words, program data, image data, sound data and other data stored in the disk (such as a DVD and a CD-ROM) 30 is read out by the disk drive 18, and are stored in the RAM 14. At the same time, if required, data stored in the hard disk drive 15 or a writable nonvolatile memory such as the memory card 31, is read out and is stored in the RAM 14.

Various initial settings having been performed so that the game can be started, for example, the keypad 50 is manipulated to move a player character. Then, when a request is received for displaying an object from a predetermined viewpoint at the movement position, the processing goes to step S1. Here, highest values are stored in the Z-buffer.

At step S1, a background model is obtained. A background model is a summary of three-dimensional coordinate data showing a background of an image. When the background model has been obtained, the processing goes to step S2.

At step S2, a Z-value of each of the vertexes of the background model from the predetermined viewpoint and display coordinates of each of the vertexes of the background model are calculated. When the Z-values of the background model and the display coordinates of the background model have been calculated, the processing goes to step S3. There, the present Z-values corresponding to the display coordinates of the vertexes of the background model, which are stored in the present Z-buffer, and the Z-values calculated at step S2 are compared. Then, it is determined whether the present Z-values stored in the Z-buffer at that time are larger than the Z-values of the vertexes of the background model.

When it is determined at step S3 that the present Z-values stored in the Z-buffer at that time are larger than the Z-values of the vertexes of the background models, the processing goes to step S4. There, the Z-values of the vertexes of the background model are stored in the Z-buffer. In addition, the corresponding image data is written in the frame buffer, and the processing goes to step S5. At step S3, when it is determined that the present Z-values stored in the Z-buffer are not larger than the Z-values of the background model, the processing directly goes to step S5.

At step S5, it is determined whether the same processing has been performed on areas corresponding to all of the vertexes of the background model. The processing at steps S3 to S5 is repeated until the processing is performed on all of the areas. When it is determined that the processing has been performed on the areas corresponding to all of the vertexes of the background model, the processing goes to step S6.

At step S6, whether another background exists is determined. If it is determined that another background exists, the processing returns to step S1. Then, processing at steps S1 to S6 is repeated. At step S6, when it is determined that other backgrounds do not exist, the processing goes to step S7.

At step S7, a simple model of an object such as a predetermined character to be processed is obtained. The simple model is a summary of three-dimensional coordinate data indicating vertexes of a hexahedron, which bounds a polygon group of the object.

Figure 4:
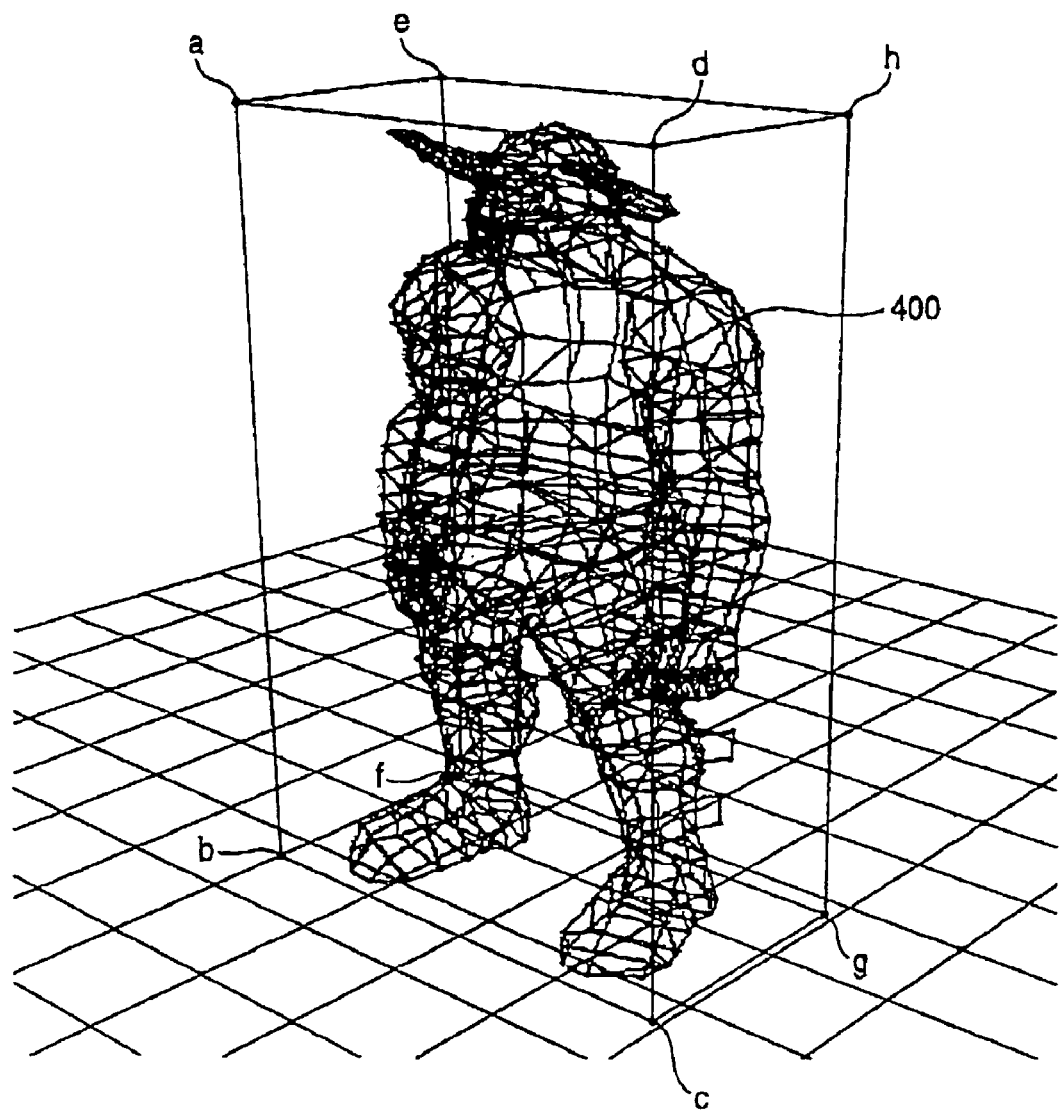
FIG. 4 is an explanatory diagram for explaining a simple model according to an embodiment of the present invention.

FIG. 4 is an explanatory diagram showing a specific example of the simple model. FIG. 4 includes a character 400 as an object. The square-pillar like hexahedron bounding the character 400 is a simple model. The simple model includes three-dimensional data for eight vertexes, a, b, c, d, e, f, g and h. Referring back to FIG. 3, when the simple model has been obtained, the processing goes to step S8.

At step S8, a Z-value of each of the vertexes of the simple model from a predetermined viewpoint and the display coordinates of each of the vertexes of the simple model are calculated. When the Z-values of the simple model and the display coordinates of the simple model have been calculated, the processing goes to step S9. Then, a rectangular Z-area (described below) is detected based upon the display coordinates calculated in step S8.

When the Z-area has been detected, an area reduced to a predetermined-size is generated based upon the detected Z-area while leaving the features of the detected Z-area. Here, the sprite function of the image processing unit provided in the graphics processing portion 16 is used. Since the unit for executing specific processing is used in this way, the processing can be performed fast. The scale of hardware does not have to be increased because the existing unit is used. Also, additional costs are not required.

Figure 5:
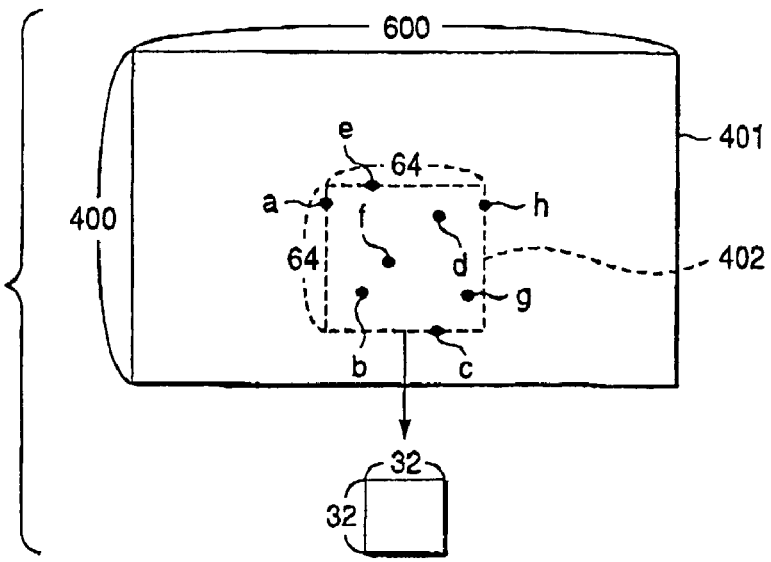
FIG. 5 is an explanatory diagram for explaining detection of a Z-area and generation processing according to an embodiment of the present invention.

FIG. 5 is an explanatory diagram conceptually showing an example of the detection of the Z-area corresponding to the display coordinates and the generation of the area of the predetermined size based upon the Z-area. In FIG. 5, an area 401 is a z-buffer having an area corresponding to a display screen having 600×400 pixels.

Here, for example, when the Z-area corresponding to eight vertexes of the simple model shown in FIG. 4 is detected through the processing at step S9, a rectangular area 402 in FIG. 5 is detected as the Z-area corresponding to the display coordinates.

In the example shown in FIG. 5, a (64×64) rectangular area is detected as the Z-area. However, the size of the rectangular area may be detected differently according to viewpoints and/or directions of the object. For example, when a viewpoint exists at a position directly across from the center of the front surface of the character 400, a rectangular area having four vertexes (a, b, c and d) at the corners is detected as the Z-area, which is different in size.

Then, an area of a predetermined size of, for example, 32×32 pixels is generated based upon the area 402 of 64×64 pixels as shown in FIG. 5, by using the sprite function of the image processing unit of the graphics processing portion 16 while leaving the characteristics of the detected Z-area. For example, the highest one of the Z-values in every Z-area corresponding to four adjacent pixels is extracted as a typical value. The typical values of the entire area 402 are extracted so that the area of the predetermined size of 32×32 is generated based upon the area 402.

The generation of the reduced size (32×32) area in this way can keep an amount of comparison processing in subsequent steps within a certain range. In this example, because the highest value is used as the typical value, the data compression does not affect the subsequent steps. Alternatively, an average value of the Z-values within the area corresponding to multiple pixels may be used as the typical value, which also contributes to faster processing.

When the generation of the area of the predetermined size has completed, the processing goes to step S11. At step S11, a minimum value Z1MIN of the simple model is extracted. Then, the minimum value Z1MIN of the simple model and all of the Z-values within the generated area, which are stored in the Z-buffer at the present time, are compared. Then, a maximum z-value Z2MAX within the generated area is extracted, and it is determined whether the minimum value Z1MIN of the simple model is larger than the maximum value Z2MAX.

At step S11, when it is determined that the minimum value Z1MIN of the simple model is larger than the maximum value Z2MAX within the generated area, the object cannot be seen from the viewpoint because of the background, for example, displayed at the present time. Thus, steps S12 to S16 are skipped. Then, the processing goes to step S17. In this way, processing by using a real model of the object, which does not have to be displayed, is not executed. As a result, the processing can be performed faster. When it is determined that the minimum value Z1MIN of the simple model is not larger than the maximum value Z2MAX within the generated area, the processing goes to step S12.

At step S12, real model data is obtained for the object of the predetermined character to be processed. The real model data is a summary of three-dimensional coordinate data indicating vertexes of the object (for example, character 400 in FIG. 4). When the real model has been obtained, the processing goes to step S13.

At step S13, Z-values of vertexes of the real model from a predetermined viewpoint and display coordinates of vertexes of the real model are calculated. When the Z-values of the vertexes of the real model and the display coordinates of the real model have been calculated, the processing goes to step S14. Then, the Z-values stored in the Z-buffer at the present time at a position corresponding to the display coordinates of the vertexes of the real model are compared with the Z-values of the vertexes calculated at step S13. Then, it is determined whether the Z-values stored in the Z-buffer at the present time are larger than the Z-values of the vertexes of the real model.

At step S14, when it is determined that the Z-values stored in the Z-buffer at the present time are larger than Z-values of the vertexes of the real model, the processing goes to step S15. At step 15, the Z-values of the vertexes of the real model are stored in the Z-buffer, and image data is written in the frame buffer. Then, the processing goes to step S16. Alternatively, at step S14, when it is determined that the Z-values stored in the Z-buffer at the present time are not larger than the Z-values of the vertexes of the real model, the processing goes to step S16 directly.

At step S16, it is determined whether the same processing is performed on the areas corresponding to all of the vertexes of the real model. Steps S14 to S16 are repeated until the processing is performed all of the areas. When it is determined that the processing is performed on the areas corresponding to all of the vertexes of the real model, the processing goes to step S17.

At step S17, it is determined whether any other target objects exists. If it is determined that another object exists, the processing returns to step S7. Then, steps S7 to S17 are repeated. If it is determined that no other objects exist at step S17, the processing goes to step S18.

At step S18, display processing is performed on the objects of the predetermined characters to be processed, and images for the predetermined objects are displayed on a screen. Then, the processing ends, and highest values are stored in the Z-buffer.

Figure 6A:
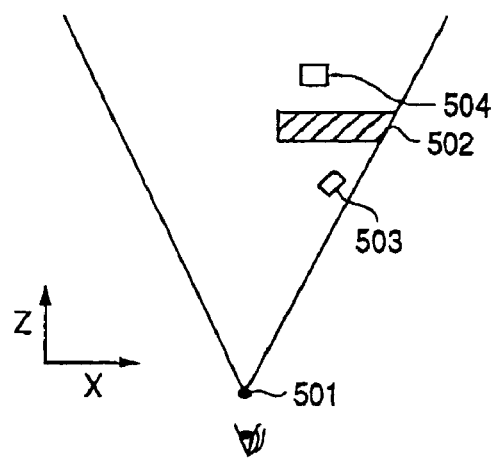
FIGS. 6A and 6B are explanatory diagrams each for explaining operations relating to the rendering processing according to an embodiment of the present invention.
Figure 6B:
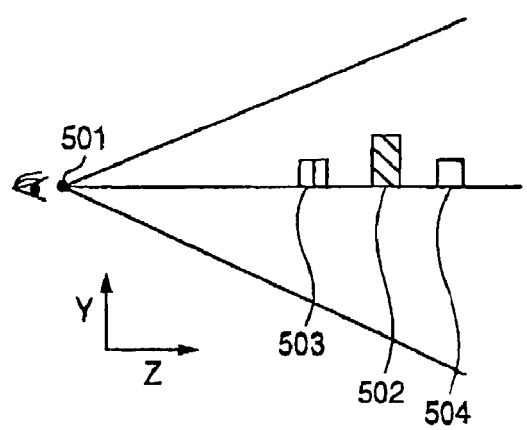

FIGS. 6A and 6B are explanatory diagrams showing positional relationships of three objects to be processed. Operations relating to the rendering processing according to this embodiment will be described more specifically with reference to FIGS. 6A and 6B.

In FIGS. 6A and 6B, a reference numeral 501 represents a viewpoint. FIG. 6A shows a positional relationship of objects within a viewing angle on an XZ-plane. FIG. 6B shows a positional relationship of objects within a viewing angle on a ZY-plane. Each of FIGS. 6A and 6B includes a background model 502 and simple models 503 and 504 for the objects to be processed. Here, the Z-values serving as depth information are stored in the Z-buffer.

First, the simple model 503 to be processed exists in front of the background model 502 with respect to the viewpoint 501. Therefore, it is determined that the minimum value Z1MIN of the simple model is not larger than the maximum value Z2MAX within the generated area of the predetermined size. As a result, a real model thereof is obtained and undergoes general processing. Thus, the Z-values of vertexes forming the object bounded by the simple model 503 are written in the Z-buffer. In addition, image data is written in the frame buffer.

The simple model 504 to be processed is positioned behind the background model 502 with respect to the viewpoint 501. Therefore, it is determined that the minimum value Z1MIN of the simple model is larger than the maximum value Z2MAX within the generated area. Thus, the subsequent steps are skipped. The real model is not obtained and does not undergo general processing for the vertexes. In addition, no writing is performed on the Z-buffer and the frame buffer.

Next, another embodiment will be described. According to the above-described embodiment, the rectangular Z-area corresponding to the display coordinates calculated from the simple model is detected at step S9, and after the completion of the Z-area detection, the processing goes to step S10 directly. In another embodiment, it may be determined that the Z-area is equal to or smaller than the predetermined area. When it is determined that it is equal to or smaller than the predetermined area, the Z-area may be replaced with the generated area directly. Then, the processing may go to step S11. When it is determined that the Z-area is larger than the predetermined area, the processing goes to step S10, where the area of the predetermined size is generated with the features of the Z-area. Such processing can suppress the amount of processing involved in comparisons at subsequent steps. Thus, more efficient processing can be achieved.

According to the above-described embodiment, a square-pillar (having rectangular planes) like hexahedron having eight vertexes, which accommodates an object, is used. However, other solids may be used as a simple model. For example, a triangle-pillar (having rectangular planes) like pentahedron having six vertexes, which accommodates an object may be used as the simple model. A simple hexahedron may be used instead of the one in the shape of the rectangular-pillar (having rectangular planes).

Furthermore, in the above-described embodiment, the simple model is obtained before the processing on the real model with respect to the object for a character. Alternatively, in another embodiment, objects may be divided into two groups in accordance with identification data attached to data of vertexes of object. With respect to the objects belonging to one group, the determination processing is performed based on the simple model. With respect to the objects belonging to the other group, the real model itself is processed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims. In addition, the components having the same functions are assigned the same reference numerals, in respective figures.

As described above, according to these embodiments, a simple model is used such that rendering processing can be performed fast. Thus, a more detailed character or more characters can be displayed, for example.

What is claimed is:

1. A video game processing method for displaying a virtual space viewed from a virtual viewpoint on a screen, comprising:
   obtaining a three dimensional simple model that bounds a polygon group of a three dimensional object in the virtual space;
   calculating first depth information from the viewpoint and display coordinates with respect to a vertex of the simple model;
   obtaining present depth information from the viewpoint with respect to an area corresponding to the display coordinates, the area comprising a rectangle bounding all vertexes of the simple model as viewed from the viewpoint, the area varying when the viewpoint changes and/or when an orientation of the object changes;
   comparing the first depth information and the present depth information; and
   stopping further processing of the object when the first depth information indicates a depth that is deeper than a depth indicated by the present depth information.

2. The video game processing method according to claim 1, wherein obtaining the present depth information further comprises obtaining one piece of typical depth information for each of a plurality of display coordinates in the area, and comparing further comprises comparing the first depth information with the typical depth information.

3. The video game processing method according to claim 2, wherein the typical depth information comprises a maximum value for each of the display coordinates in the area.

4. The video game processing method according to claim 1, wherein the simple model comprises a hexahedron having eight vertexes.

5. The video game processing method according to claim 1, wherein identification information is added to data of the object, and wherein, when the identification information indicates that the simple model is used, the calculating the first depth information and display coordinates is performed.

6. The video game processing method according to claim 1, wherein obtaining the present depth information further comprises transforming the area corresponding to the display coordinates; and the present depth information with respect to an area corresponding to the display coordinates is the depth information with respect to the transformed area corresponding to the display coordinates.

7. A video game processing apparatus for displaying a virtual space viewed from a virtual viewpoint on a screen, comprising:
   a first obtaining system that obtains a three dimensional simple model bounding a polygon group of a three dimensional object in the virtual space;
   a calculator that calculates first depth information from the viewpoint and display coordinates with respect to a vertex of the simple model;
   a second obtaining system that obtains present depth information from the viewpoint with respect to an area corresponding to the display coordinates, the area comprising a rectangle bounding all vertexes of the simple model as viewed from the viewpoint, the area varying when the viewpoint changes and/or when an orientation of the object changes;
   a comparator that compares the first depth information with the present depth information;
   and a stopping system that stops further processing of the object when the first depth information indicates a depth that is deeper than a depth indicated by the present depth information.

8. The video game processing apparatus according to claim 7, wherein the second obtaining system obtains one piece of typical depth information for each of a plurality of display coordinates in the area; and the comparator compares the first depth information with the typical depth information.

9. The video game processing apparatus according to claim 8, wherein the second obtaining system is implemented by an image processing unit having an image reduction function, and the typical depth information for each of the display coordinates in the area is obtained by the image processing unit.

10. The video game processing apparatus according to claim 8, wherein the typical depth information comprises a maximum value for each of the display coordinates in the area.

11. The video game processing apparatus according to claim 7, wherein the simple model comprises a hexahedron having eight vertexes.

12. The video game processing apparatus according to claim 7, wherein identification information is added to data of the object, and the first obtaining system further comprises a supply system, wherein, when the identification information indicates that the simple model is used, the supply system supplies the data of the object to the first obtaining system.

13. The video game processing apparatus according to claim 7, wherein the second obtaining system that obtains the present depth information further comprises a transforming system that transforms the area corresponding to the display coordinates; and the present depth information with respect to an area corresponding to the display coordinates is the depth information with respect to the transformed area corresponding to the display coordinates.

14. A computer readable recording medium on which is recorded a video game program for displaying a virtual space viewed from a virtual viewpoint on a screen, the program causing a computer to execute:
   obtaining a three dimensional simple model bounding a polygon group of a three dimensional object in the virtual space;
   calculating first depth information from the viewpoint and display coordinates with respect to a vertex of the simple model;
   obtaining present depth information from the viewpoint with respect to an area corresponding to the display coordinates, the area comprising a rectangle bounding all vertexes of the simple model as viewed from the viewpoint, the area varying when the viewpoint changes and/or when an orientation of the object changes;
   comparing the first depth information with the present depth information; and
   stopping further processing of the object when the depth information obtained by the first depth information indicates a depth that is deeper than a depth indicated by the present depth information.

15. The computer readable recording medium according to claim 14, wherein obtaining the present depth information further comprises obtaining one piece of typical depth information for each of the plurality of display coordinates in the area; and comparing further comprises comparing the first depth information obtained with the typical depth information.

16. The computer readable recording medium according to claim 15, wherein the typical depth information comprises a maximum value for each of the display coordinates in the area.

17. The computer readable recording medium according to claim 14, wherein the simple model comprises a hexahedron having eight vertexes.

18. The computer readable recording medium according to claim 14, wherein identification information is added to data of the object, and wherein, when the identification information indicates that the simple model is used, the calculating the first depth information and display coordinates is performed.

19. The computer readable recording medium according to claim 14, wherein obtaining the present depth information further comprises transforming the area corresponding to the display coordinates; and the present depth information with respect to an area corresponding to the display coordinates is the depth information with respect to the transformed area corresponding to the display coordinates.

* * * * *